A. E. LIPP.
CAMERA SHUTTER.
APPLICATION FILED MAY 6, 1912.
1,102,278.
Patented July 7, 1914.
2 SHEETS—SHEET 2.
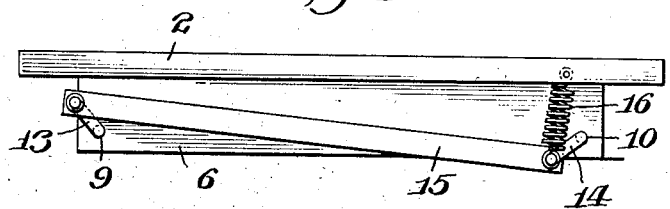
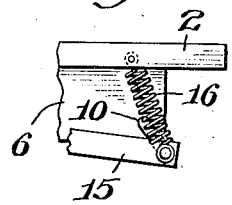
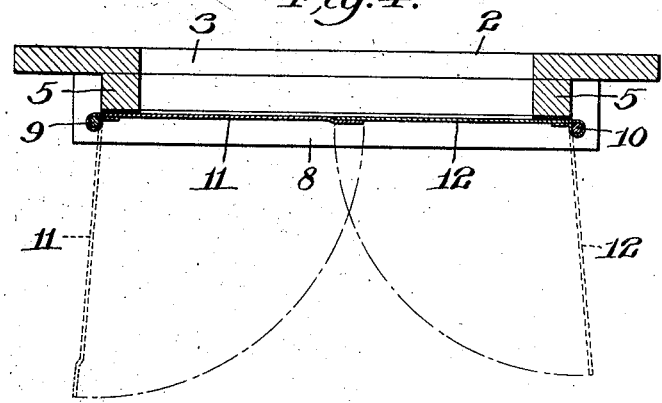
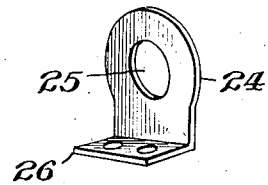
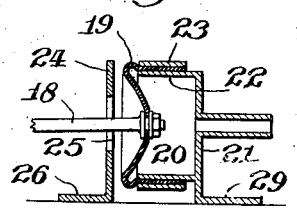
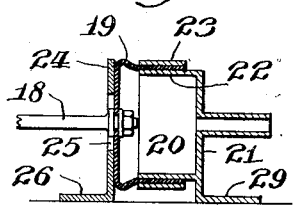
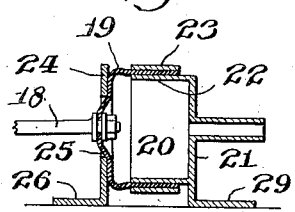
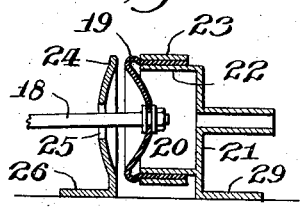
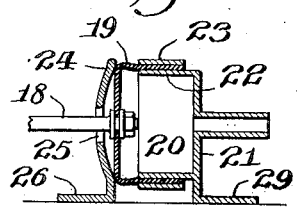
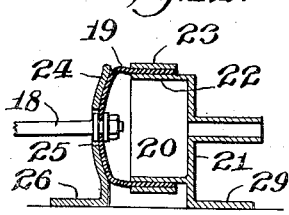
WITNESSES:
W. E. Watson
G. P. Sharkey
INVENTOR:
Albert E. Lipp,
BY
A. V. Grouse
ATTORNEY.

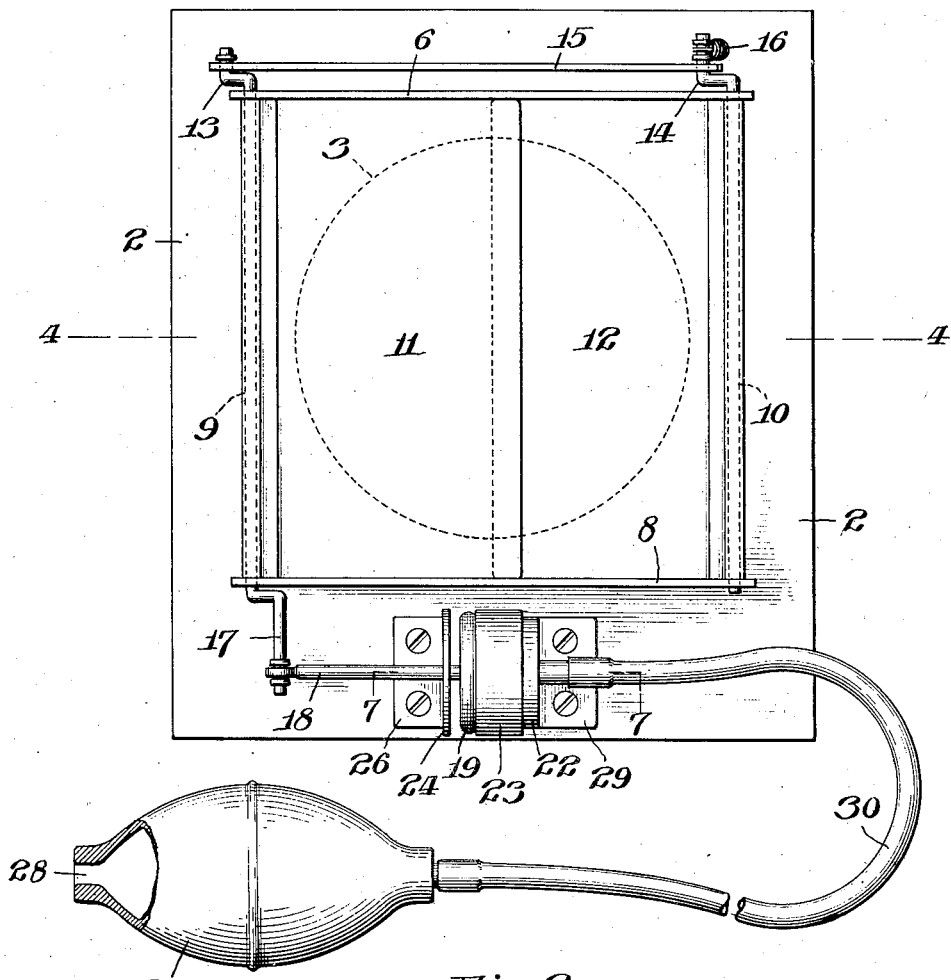

UNITED STATES PATENT OFFICE.

ALBERT E. LIPP, OF PHILADELPHIA, PENNSYLVANIA.

CAMERA-SHUTTER.

1,102,278. Specification of Letters Patent. Patented July 7, 1914.

Application filed May 6, 1912. Serial No. 695,589.

*To all whom it may concern:*

Be it known that I, ALBERT E. LIPP, a citizen of the United States, residing at Philadelphia, in the county of Philadelphia and State of Pennsylvania, have invented certain new and useful Improvements in Camera-Shutters, of which the following is a specification.

The object of my invention is to provide a novel, simple and efficient operating means for camera shutters, such means having provision whereby the shutter may be noiselessly opened, so as not to attract the attention of and thereby disturb the subject being photographed when the photographic plate or film is exposed; and a further object of the invention is to provide a novel mechanism whereby the shutter may be maintained in either the closed or the open position by means of a single spring; as will be hereinafter fully described and particularly claimed.

In the accompanying drawings, illustrating my invention: Figure 1, is an elevation of the inside of the front wall of a camera casing having an exposure opening and provided with a shutter and operating means therefor, embodying my invention. Fig. 2, is a bottom view of the parts shown in Fig. 1. Fig. 3, is a top view of the parts shown in Fig. 1. Fig. 4, is a section on line 4—4 of Fig. 1. Fig. 5, is a detail, showing the position of the shutter holding spring, when the shutter is in the open position. Fig. 6, is a perspective view of the baffle wall. Fig, 7, is a section, on line 7—7 of Fig. 1, showing the positions of the flexible wall and the connected end of the shutter operating rod, when the shutter is in the closed position. Figs. 8 and 9 are views similar to Fig. 7, showing different positions of the parts during the opening of the shutter. Figs. 10, 11 and 12, are views similar to Figs, 7, 8 and 9, respectively, showing a modified form of baffle wall.

Referring to the drawings, 2 designates a support, constituting the front wall or lens-board of an ordinary camera casing. The support or lens-board 2 is provided with an exposure opening 3 through which the rays of light are admitted to the camera casing, in exposing plates or films in making photographs. Secured to the inner face of the lens-board 2 is a square board or block 5 of smaller dimensions than the lens-board and having an exposure opening therein corresponding with and forming a continuation of the opening 3.

Secured to the top and bottom of the inner board and arranged at right angles to the lens-board and extending inwardly from the inner face of the board 5 are parallel plates 6 and 8. Extending between and mounted to turn in openings in the plates 6 and 8 are two parallel, vertical rods 9 and 10. The rod 9 is located on one side of the exposure opening 3 and the rod 10 is located on the other side of the exposure opening. Secured to the rods 9 and 10 are the outer vertical edges of two plates or shutters 11 and 12, respectively, which lie normally against the inner face of the board 5 with their inner edges overlapping each other, as shown. In this position, the plates 11 and 12 cover the exposure opening 3 and the shutter is closed. A layer of felt or other suitable material is interposed between the plates 11 and 12 and the board 5 and secured to the board 5 to form a light tight joint between it and the plates.

The upper ends of the rods 9 and 10 extend above the plate 6 and are provided with projecting crank arms 13 and 14, respectively, which are connected by a bar 15, as clearly shown in Figs. 1 and 3. The crank arms 13 and 14 are so disposed with relation to each other that, when one shutter plate 11 or 12 is moved from the closed or full line position shown in Fig. 4 to the open or dotted line position shown therein, the other shutter plate will be correspondingly moved.

The shutter plates 11 and 12 are held in the closed position, shown by full lines in Fig. 4, or open position, shown by dotted lines in Fig. 4, by a coiled spring 16, one end of which is attached to the crank arm 14, and the other end of which is attached to the lens-board 2. The spring 16 is connected to the lens-board 2 with relation to the axis of the rod 10 forming the pivot for the crank arm 14, so that when the shutter plates 11 and 12 are in the closed position, the axis of the spring 16 will be on one side of the line of the axis of the rod 10, as shown in Fig. 3, and so that when the shutter plates are in the open position, the axis of the spring 16 will be on the opposite side of the line of the axis of the rod 10, as shown in Fig. 5.

The lower end of the rod 9 is provided with a crank arm 17 which is pivoted to one end of a rod 18. The other end of the rod 18 is secured to the center of a flexible wall 19 of an air chamber 20 which comprises a plate 21, an annular flange 22 extending from the plate 21 and the flexible wall or head 19 surrounding the flange 22 and extending over and closing the open side thereof. The wall 19 is preferably made of leather, and the part thereof surrounding the flange 22 is secured thereto by a string wrapped around the leather and flange 22. The wrapped portion of the leather is protected by a surrounding metal ring 23. The plate or wall 21 of the chamber 20 extends from the lens-board 2 and is secured thereto by means of screws passing through a flange 24 on the plate 21.

The free portion of the leather forming the flexible wall 19 is made with sufficient fullness to permit it to be drawn into the flange 22, as shown in Fig. 7, when air is exhausted from the chamber 20 and to permit it to extend from the flange 22, as shown in Fig. 9, when air is forced into the chamber 20; and the crank arm 17 is so related to the parts to which it is connected that when air is forced into the chamber 20 to move the flexible wall 19 outwardly, the rod 18 will be moved thereby to operate the crank arm 17 to open the shutter, and that when air is exhausted from the chamber 20 to draw the flexible wall 19 inwardly, the rod will be moved thereby to operate the crank arm 17 to close the shutter.

Arranged adjacent the flexible wall 19 of the chamber 20 is a baffle plate or wall 24 which extends transversely to the rod 18 and is provided with an opening 25 therein larger than the diameter of the rod 18 and through which the rod 18 extends. The baffle wall 24 is fixed to the lens-board or support 2 by means of screws passing through a flange 26 extending from the wall or plate 24 and arranged against the lens-board. When the flexible wall 19 is moved outwardly it engages the baffle wall 24, as and for a purpose hereinafter explained.

To force air into and exhaust it from the chamber 20, I provide a hollow rubber bulb 27, one end of which is open, at 28, and the other end of which is connected to and communicates with one end of a flexible tube 30. The other end of the tube 30 communicates with the chamber 20 and is connected to a projection on the plate or wall 21 thereof.

The operation is as follows: When the shutter is closed the parts are in the normal positions shown by full lines in Figs. 1, 2, 3, 4 and 5. In this position of the parts, the operator takes the bulb 27 in one hand and places his thumb over and closes the opening 28 in one end thereof. He then quickly compresses the bulb 27 forcing the air therein into the chamber 20 and forcing the flexible wall 19 outwardly from the position shown in Fig. 7 to the position shown in Fig. 9, thereby opening the shutter, as previously explained. Just before the shutter blades 11 and 12 reach the open position, shown by dotted lines in Fig. 4, the flexible wall 19 strikes the baffle wall 24, as shown in Fig. 8, thereby retarding its movement and also the movement of the blades 11 and 12; and as the air within the chamber 20, acting against the flexible wall 19, forces it through the opening 25 in the baffle wall 24 to the position shown in Fig. 9, the blades 11 and 12 complete their movement to the open position, being cushioned by the flexible wall 19 engaging the baffle wall 24 and being forced through the opening 25. It will thus be readily understood that the shutter may be quickly opened and that just as the shutter blades complete their movement to the open position, the operating parts will be cushioned by the action of the flexible wall against the baffle wall 24, in a manner to eliminate all objectionable noise. After the shutter has been opened, the thumb of the operator may be removed from the opening 28 in the bulb 27. The spring 16 will then maintain the shutter in the open position until the operator again compresses the bulb 27 places his thumb over the opening 28, and releases the bulb. This operation causes the bulb 27, in resuming its normal condition, to exhaust air from the chamber 20 and draw the flexible wall 19 thereof back into the position shown in Fig. 7, thereby moving the rod 18 back and operating the crank arm 17 to move the shutter blades back to the closed position for a succeeding operation.

In the modification shown in Figs. 10, 11 and 12, the face of the baffle wall 24 toward the flexible wall 19 is made concave and the opening 25 therein is made slightly smaller than the opening shown in Figs. 7, 8 and 9; and the operation of this modified form of baffle wall 24 and the flexible wall 19 is the same as previously described with the following exceptions: Just before the shutter blades 11 and 12 reach the open position, the flexible wall 19 strikes the outer portion of the concave face of the baffle wall 24, as shown in Fig. 11; and as the blades complete their movement to the open position, the central portion of the flexible wall 19 is forced against the central portion of the concave face of the baffle wall, as shown in Fig. 12, thereby effecting the cushioning of the final movement of the blades and their operating parts.

I claim:

1. The combination of a support having an exposure opening therein, a shutter movable to and from said opening, an air chamber having a flexible wall, a rod connected to and extending from said wall and operatively connected to said shutter, means operative to introduce air to and exhaust it from said chamber, and a baffle wall adjacent said flexible wall, said flexible wall being movable into engagement with said baffle wall.

2. The combination of a support having an exposure opening therein, a shutter movable to and from said opening, an air chamber having a flexible wall, a baffle wall adjacent said flexible wall and having an opening therein, said flexible wall being movable into engagement with said baffle wall, a rod connected to said flexible wall and extending through said opening and operatively connected to said shutter, and means operative to introduce air to and exhaust it from said chamber.

3. The combination of a support having an exposure opening therein, a shutter movable to and from said opening, an air chamber having a flexible wall, a rod connected to and extending from said wall and operatively connected to said shutter, means operative to introduce air to and exhaust it from said chamber, and a concave baffle wall adjacent said flexible wall, said flexible wall being movable into engagement with said baffle wall.

4. The combination of a support having an exposure opening therein, a shutter movable to and from said opening, an air chamber having a flexible wall, a concave baffle wall adjacent said flexible wall and having an opening therein, said flexible wall being movable into engagement with said baffle wall, a rod connected to said flexible wall and extending through said opening and operatively connected to said shutter, and means operative to introduce air to and exhaust it from said chamber.

In testimony whereof I affix my signature in presence of two witnesses.

ALBERT E. LIPP.

Witnesses:
 S. I. HARPER,
 A. V. GROUPE.